United States Patent
Burdine et al.

(10) Patent No.: US 7,392,449 B2
(45) Date of Patent: *Jun. 24, 2008

(54) METHOD, APPARATUS, AND COMPUTER PROGRAM PRODUCT FOR DIAGNOSING A SCAN CHAIN FAILURE EMPLOYING FUSES COUPLED TO THE SCAN CHAIN

(75) Inventors: Todd M. Burdine, Zainesville, OH (US); Donato O. Forlenza, Hopewell Junction, NY (US); Orazio P. Forlenza, Hopewell Junction, NY (US); William J. Hurley, Poughkeepsie, NY (US); Phong T. Tran, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/956,480

(22) Filed: Dec. 14, 2007

(65) Prior Publication Data

US 2008/0091999 A1    Apr. 17, 2008

Related U.S. Application Data

(63) Continuation of application No. 11/149,483, filed on Jun. 9, 2005.

(51) Int. Cl.
*G01R 31/28* (2006.01)
(52) U.S. Cl. ...................................... 714/726
(58) Field of Classification Search ................ None
See application file for complete search history.

(56) References Cited

U.S. PATENT DOCUMENTS 4,503,386 A    3/1985 DasGupta et al.

(Continued)

FOREIGN PATENT DOCUMENTS

JP    62195169 A    8/1987

(Continued)

OTHER PUBLICATIONS

Ismet Bayraktaroglu et al., "Gate Level Fault Diagnosis in Scan-Based BIST," Proceedings of the 2002 Design Automation and Test in Europe Conference, 1530-1591/02 IEEE.

(Continued)

*Primary Examiner*—Cynthia Britt
*Assistant Examiner*—Guerrier Merant
(74) *Attorney, Agent, or Firm*—Heslin Rothenberg Farley & Mesiti, PC

(57) ABSTRACT

A method, apparatus and computer program product are provided implementing a scan chain diagnostics technique. The diagnostics technique includes employing fuses coupled to latches of the scan chain to load a known logic value into the latches at known locations of the scan chain, and then unloading values from the scan chain, and if the scan chain is defective (for example, based on the unloaded logic values), then localizing a defect in the scan chain from the unloaded logic values by comparison thereof with the known locations of the latches of the scan chain loaded with the known logic value via the fuses. The scan chain may be predesigned with fuses spaced periodically across the chain every n latches to facilitate subsequent localization of a detected defect in the scan chain.

11 Claims, 8 Drawing Sheets

U.S. PATENT DOCUMENTS

| | | | |
|---|---|---|---|
| 4,630,270 | A | 12/1986 | Petit et al. |
| 5,313,424 | A | 5/1994 | Adams et al. |
| 5,640,402 | A | 6/1997 | Motika et al. |
| 5,657,332 | A | 8/1997 | Auclair et al. |
| 5,677,917 | A | 10/1997 | Wheelus et al. |
| 5,859,804 | A | 1/1999 | Hedberg et al. |
| 5,951,703 | A | 9/1999 | Sprouse et al. |
| 6,249,465 | B1 | 6/2001 | Weiss et al. |
| 6,278,956 | B1 | 8/2001 | Leroux et al. |
| 6,308,290 | B1 | 10/2001 | Forlenza et al. |
| 6,385,750 | B1 | 5/2002 | Kapur et al. |
| 6,442,720 | B1 | 8/2002 | Koprowski et al. |
| 6,519,202 | B1 | 2/2003 | Shubat et al. |
| 6,618,826 | B1 | 9/2003 | Chen et al. |
| 6,662,327 | B1 | 12/2003 | Rajski |
| 6,694,454 | B1 | 2/2004 | Stanley |
| 6,807,646 | B1 | 10/2004 | Williams et al. |
| 6,950,974 | B1 | 9/2005 | Wohl et al. |
| 6,993,694 | B1 | 1/2006 | Kapur et al. |
| 7,058,869 | B2 | 6/2006 | Abdel-Hafez et al. |
| 7,071,704 | B1 | 7/2006 | Crowell |
| 7,107,502 | B2 | 9/2006 | Burdine et al. |
| 7,194,706 | B2 | 3/2007 | Adkisson et al. |
| 7,225,374 | B2 | 5/2007 | Burdine et al. |
| 2002/0125907 | A1 | 9/2001 | Kurtulik et al. |
| 2003/0131294 | A1 | 7/2003 | Motika et al. |
| 2003/0229834 | A1 | 12/2003 | Cooke |
| 2004/0003329 | A1 | 1/2004 | Cote et al. |
| 2004/0246337 | A1 | 12/2004 | Hasegawa et al. |
| 2005/0022142 | A1 | 1/2005 | Cheng et al. |
| 2005/0047224 | A1 | 3/2005 | Farnsworth et al. |
| 2005/0229057 | A1 | 10/2005 | Anderson et al. |
| 2006/0026472 | A1 | 2/2006 | Adkisson et al. |
| 2006/0123375 | A1 | 6/2006 | Cheng et al. |
| 2006/0200719 | A1 | 9/2006 | Keller |

FOREIGN PATENT DOCUMENTS

JP          06230075  A       8/1994

OTHER PUBLICATIONS

Giuseppe A. Sarrica et al., Theory and implementation of LSSD Scan Ring & Stumps Channel Test and Diagnosis,' Sep. 28-30, 1992, Electronics Manufacturing Techology Symposium, 1992; Thirteenth IEEE/CHMT International, pp. 195-201.

Guo et al., "A Technique for Fault Diagnosis of Defects in Scan Chains", IEEE, paper 10.2, 2001, pp. 268-277, USA.

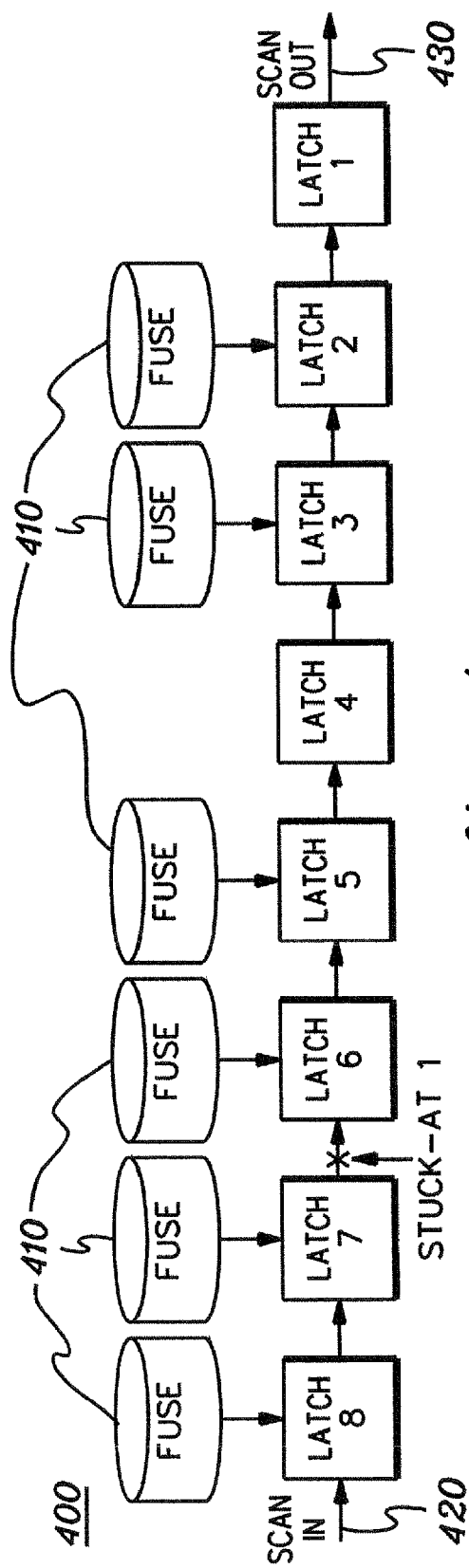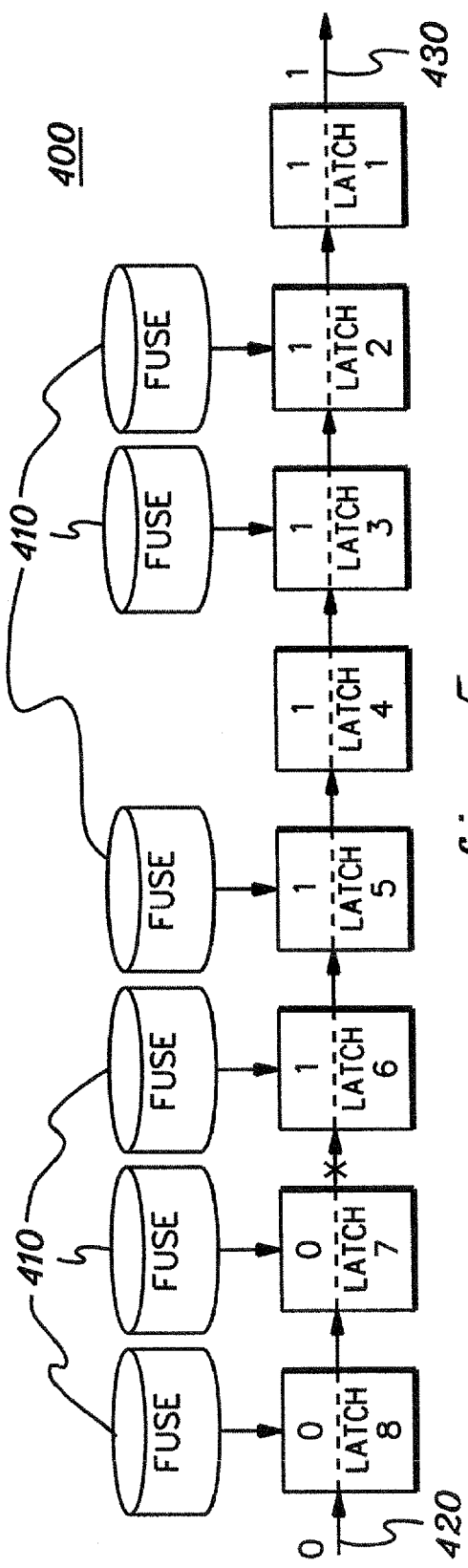

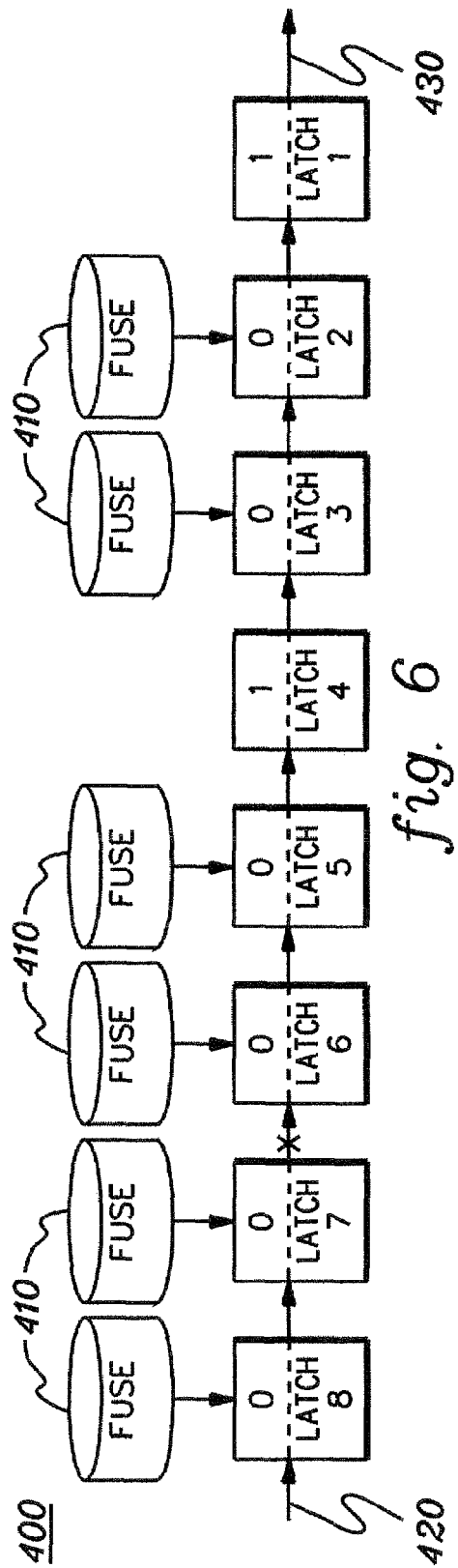

```
LOCATION OF FUSES =  X   X   X   X        X   X
ACTUAL LATCHES (8:1) = 1   1   0   0   1   0   0   1
                                ↑
                       BREAK IS AT LATCH 7
``` fig. 8

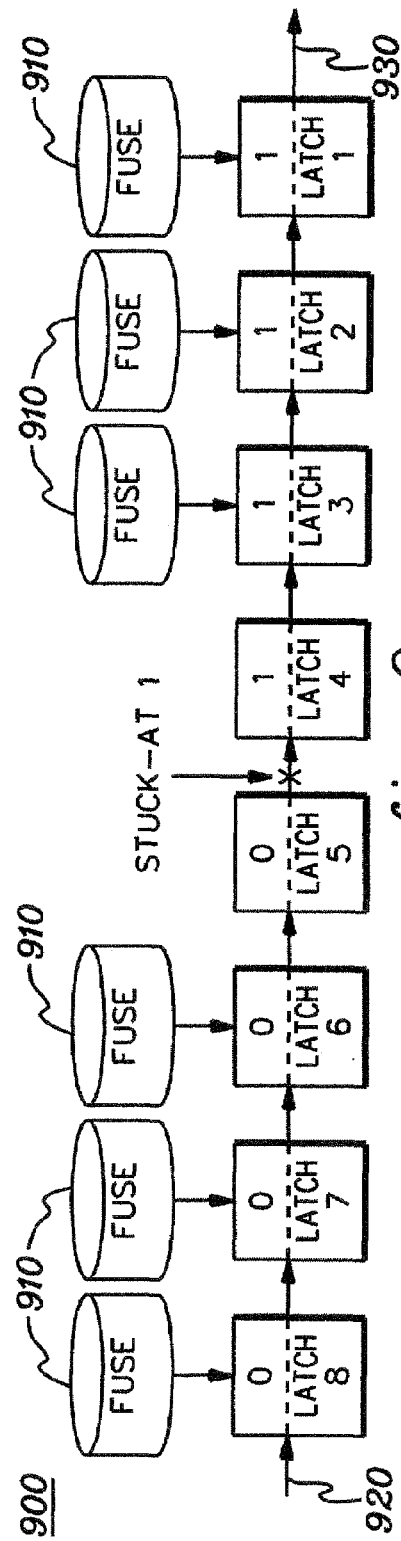

LOCATION OF FUSES =   X   X   X         X   X   X
ACTUAL LATCHES (8:1) =   1   1   1   1   1   0   0   0

BREAK IS BETWEEN LATCHES 4-6

METHOD, APPARATUS, AND COMPUTER PROGRAM PRODUCT FOR DIAGNOSING A SCAN CHAIN FAILURE EMPLOYING FUSES COUPLED TO THE SCAN CHAIN

CROSS REFERENCE TO RELATED APPLICATIONS

This application is a continuation of U.S. patent application Ser. No. 11/149,483, filed on Jun. 9, 2005, entitled "Method, Apparatus, and Computer Program Product for Diagnosing a Scan Chain Failure Employing Fuses Coupled to the Scan Chain", by Burdine et al., and published on Jan. 11, 2007, as U.S. Publication No. US-2007-0011523 A1, the entirety of which is incorporated herein by reference.

This application contains subject matter which is related to the subject matter of the following application/patents, each of which is assigned to the same assignee as this application, and each of which is hereby incorporated herein by reference in its entirety:

"Method, Apparatus, and Computer Program Product For Implementing Deterministic Based Broken Scan Chain Diagnostics", Anderson et al., U.S. Ser. No. 10/821,160, filed Apr. 8, 2004, and published Oct. 13, 2005 as U.S. Publication No.US-2005-0229057 A1;

"ABIST-Assisted Detection of Scan Chain Defects", Burdine et al., U.S. Pat. No. 7,225,374, issued May 29, 2007; and "Diagnostic Method For Detection of Multiple Defects in a Level Sensitive Scan Design (LSSD)", Todd M. Burdine, U.S. Pat. No. 7,107,502, issued Sep. 12, 2006.

TECHNICAL FIELD OF THE INVENTION

The present invention relates generally to the field of testing and diagnosis of defects in integrated circuits, and more particularly, to a method, apparatus and computer program product for testing and diagnosis of scan chain failures in integrated circuits.

BACKGROUND OF THE INVENTION

A continuing problem for VLSI testing is how to diagnose an exact location of a broken scan chain or chains. When there is low or zero yield, the scan chains are often broken so that the only opportunity to learn and diagnose the root cause of the problem is defect localization based upon scan chain failure data. Other test applications, such as, Level Sensitive Scan Design (LSSD), Logic Built In Self Test (LBIST), Array Built In Self Test (ABIST), functional, Design-For-Test (DFT) and Design-For-Diagnostics (DFD), all assume the scan chains are operational.

The problem of a broken scan chain or chains is usually encountered early in a technology life cycle and diagnostics is critical in improving the fabrication process so that manufacturing yield levels can be quickly achieved. An inability to improve the technology and yield can greatly impact a program or at least severely minimize the revenue that could be realized.

Rapid diagnosis to a location for Physical Failure Analysis (PFA) is needed to understand and correct process anomalies. In these low or zero yield situations, the most common failure is often the scan chain. The LSSD Flush and Scan tests will fail when there is one or more broken scan chains on a device. In these cases, there is no operating region where the scan chains are functional. Since most other tests utilize the scan chain to perform device tests, diagnostics of the broken scan chain or scan chains with hard DC flush and scan fails is extremely limited. Also as density of VLSI devices continue to increase, their respective scan chains will continue to increase in size proportionally and thus, this problem will become even more severe. Fault simulation/test generation, providing extremely vital tools for diagnosing combinational faults, is very inefficient and ineffective for shift register (SR) diagnostics. Hence, a solution is needed which speeds broken scan chain diagnostics on the majority of the failing devices to enable timely process corrections and yield improvements.

Existing methods and approaches to this problem include dumping megafail data on the tester, Automatic Test Pattern Generation (ATPG) directed at each hypothetical broken latch, voltage and timing sensitive methods, IDDQ walk current measurements, power up/down techniques, and LBIST/ABIST engine based techniques. Significant drawbacks are that the known solutions require very large data volumes, extremely long simulation times, and are not always 100% reliable, and further not one single known method is always successful all the time. This can be attributed to the nature of the particular fault and its manifestation, complex faults, and that faults are not limited to the type of chip area that propagates to system paths of the broken latch or latches whether it originates from combinational logic or array outputs.

A need thus exists for fast and efficient techniques that diagnose defects in a broken scan chain or chains and that facilitate defect localization for Physical Failure Analysis (PFA).

SUMMARY OF THE INVENTION

The shortcomings of the prior art are overcome and additional advantages are provided through the provision of a method for performing diagnostics on a scan chain having a plurality of latches. The method includes: employing at least one fuse coupled to at least one latch of the scan chain to load a first logic value into the at least one latch at known location(s) within the scan chain; and unloading logic values from the scan chain, and if the scan chain is defective, localizing a defect in the scan chain from the unloaded logic values by comparison thereof with the known location(s) of the at least one latch of the scan chain loaded with the first logic value via the at least one fuse.

In enhanced aspects, the method includes predesigning the scan chain with fuses spaced periodically across the scan chain every n latches to facilitate the subsequent localizing of a defect in the scan chain (wherein n μ2). A fuse read pattern is employed to initiate loading of a first logic value from the fuses into the latches of the scan chain. In one implementation, the fuses could be electronic fuses or laser fuses. When the fuses are an open, a logic value 0 is transferred to the corresponding latches, while a logic value 1 can be transferred by blowing the fuses, inverting read outputs of the fuses, or applying a logic OR function to the read output of the fuses. Further, the method can include prior to employing the fuses, loading the first logic value into the scan chain by attempting to propagate the first logic value from an input to an output of the scan chain. A broken scan chain is detected when the logic value at the output is other than the first logic value propagated from the input.

Apparatuses and computer program products corresponding to the above-summarized methods are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 is a block diagram representation of one implementation of a scan chain with a fault to be diagnosed, in accordance with an aspect of the present invention;

FIG. 5 is a block diagram representation of the scan chain of FIG. 4, showing latch logic values of the scan chain after attempted propagation of a logic value 0 from an input to an output of the scan chain, in accordance with an aspect of the present invention;

FIG. 6 is a block diagram representation of the scan chain of FIGS. 4 & 5, after the fuses have been employed to load a logic value 0 into the associated latches at known locations of the scan chain, in accordance with an aspect of the present invention;

FIG. 7 is a table of latch logic value states for the various steps of the scan chain fault example of FIGS. 4-6, and showing unloading of logic values of the scan chain employing successive scan clocks, in accordance with an aspect of the present invention;

FIG. 8 is a representation of the unloaded data of FIG. 7 compared with actual fuse locations to facilitate defect localization within the scan chain, in accordance with an aspect of the present invention;

FIG. 9 is a block diagram representation of a further scan chain implementation, showing logic value states for the latches after attempted propagation of logic value 0 from the input to the output of the scan chain, in accordance with an aspect of the present invention;

FIG. 10 is a table of latch logic states for the scan chain defect example of FIG. 9, and showing attempted propagation of a logic value 0 through the scan chain, loading of a logic value 0 into the scan chain at known locations via the fuses, and unloading of the resulting scan chain logic values in successive scan clocks cycles, in accordance with an aspect of the present invention.

BEST MODE FOR CARRYING OUT THE INVENTION

In accordance with features of the invention, a diagnostics technique is provided which employs fuses coupled to a scan chain to diagnose a defect therein. More particularly, diagnosing of a broken scan chain is accomplished by utilizing, in one embodiment, existing on-chip hardware (such as electronic fuses) to load at multiple locations, for example, a logic value 0 into a broken scan chain which has a stuck-at 1 defect. Scan chain logic values are then unloaded and a determination is made whether the scan chain is defective. If so, then a defect is localized within the scan chain from the unloaded logic values by comparison thereof with the known locations of the latches of the scan chain loaded with the logic value 0 via the fuses. With a minor enhancement to the technique, stuck-at 0 conditions can also be readily diagnosed.

Figure 1:
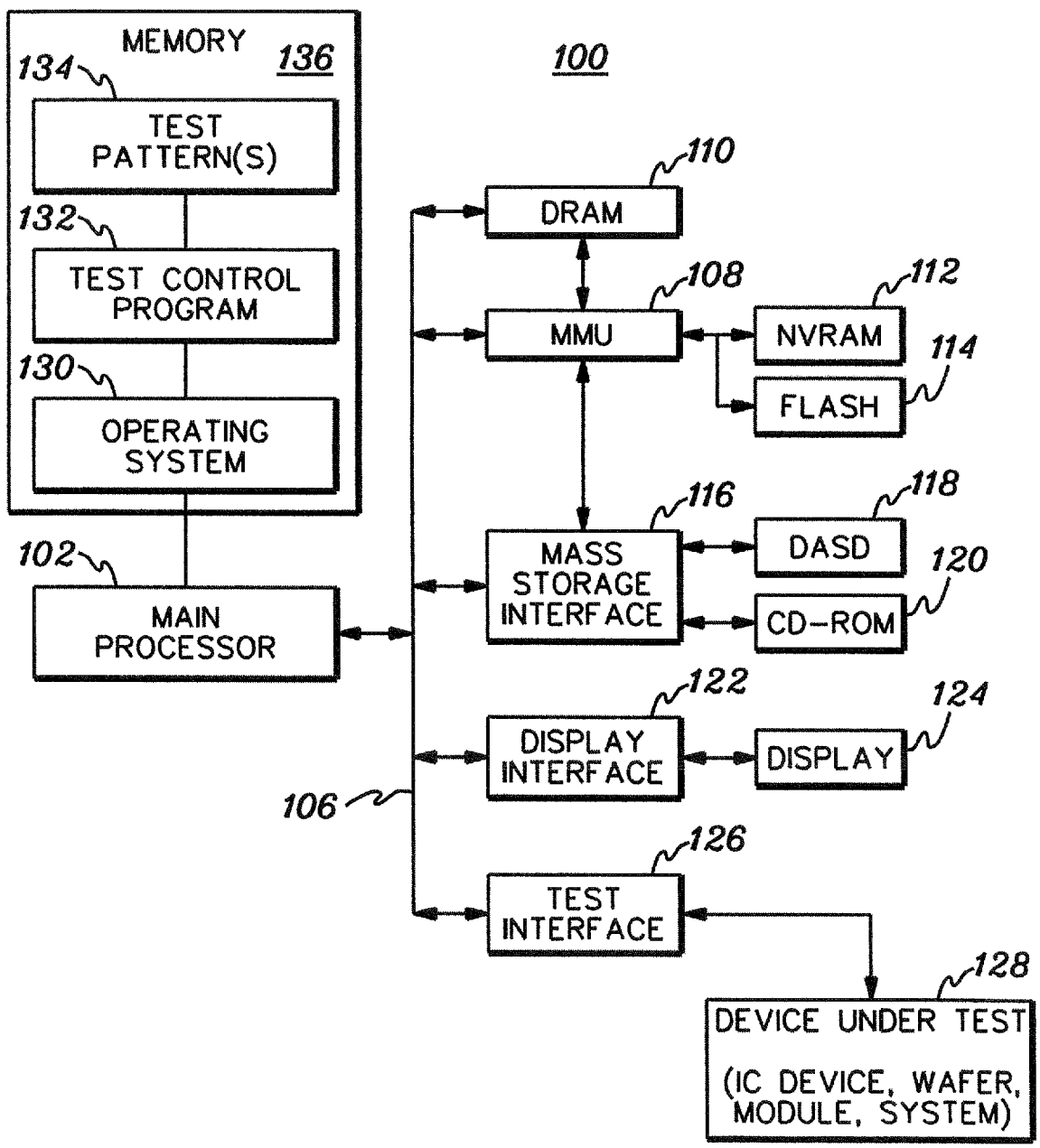
FIG. 1 is a block diagram representation illustrating an exemplary computer test system for implementing scan chain diagnostics, in accordance with an aspect of the present invention.

Referring now to the drawings, in FIG. 1 there is shown an exemplary computer test system generally designated by the reference character 100 for implementing scan chain diagnostics in accordance with an aspect of the present invention. Computer test system 100 includes a main processor or central processor unit (CPU) 102 coupled by a system bus 106 to a memory management unit (MMU) 108 and system memory including a dynamic random access memory (DRAM) 110, a nonvolatile random access memory (NVRAM) 112, and a flash memory 114. A mass storage interface 116 coupled to the system bus 106 and MMU 108 connects a direct access storage device (DASD) 118 and a CD-ROM drive 120 to the main processor 102. Computer test system 100 includes a display interface 122 connected to a display 124, and a test interface 126 coupled to the system bus 106. A device under test 128 is coupled to the test interface 126. The device under test 128 includes, for example, an integrated circuit wafer, a module, or a system. Computer test system 100 includes an operating system 130, a test control program 132, and one or more test patterns 134 resident in a memory 136.

Computer test system 100 is shown in simplified form sufficient for understanding the present invention. The illustrated computer test system 100 is not intended to imply architectural or functional limitations. The present invention can be used with various hardware implementations and systems and various other internal hardware devices, for example, multiple main processors.

Figure 2:
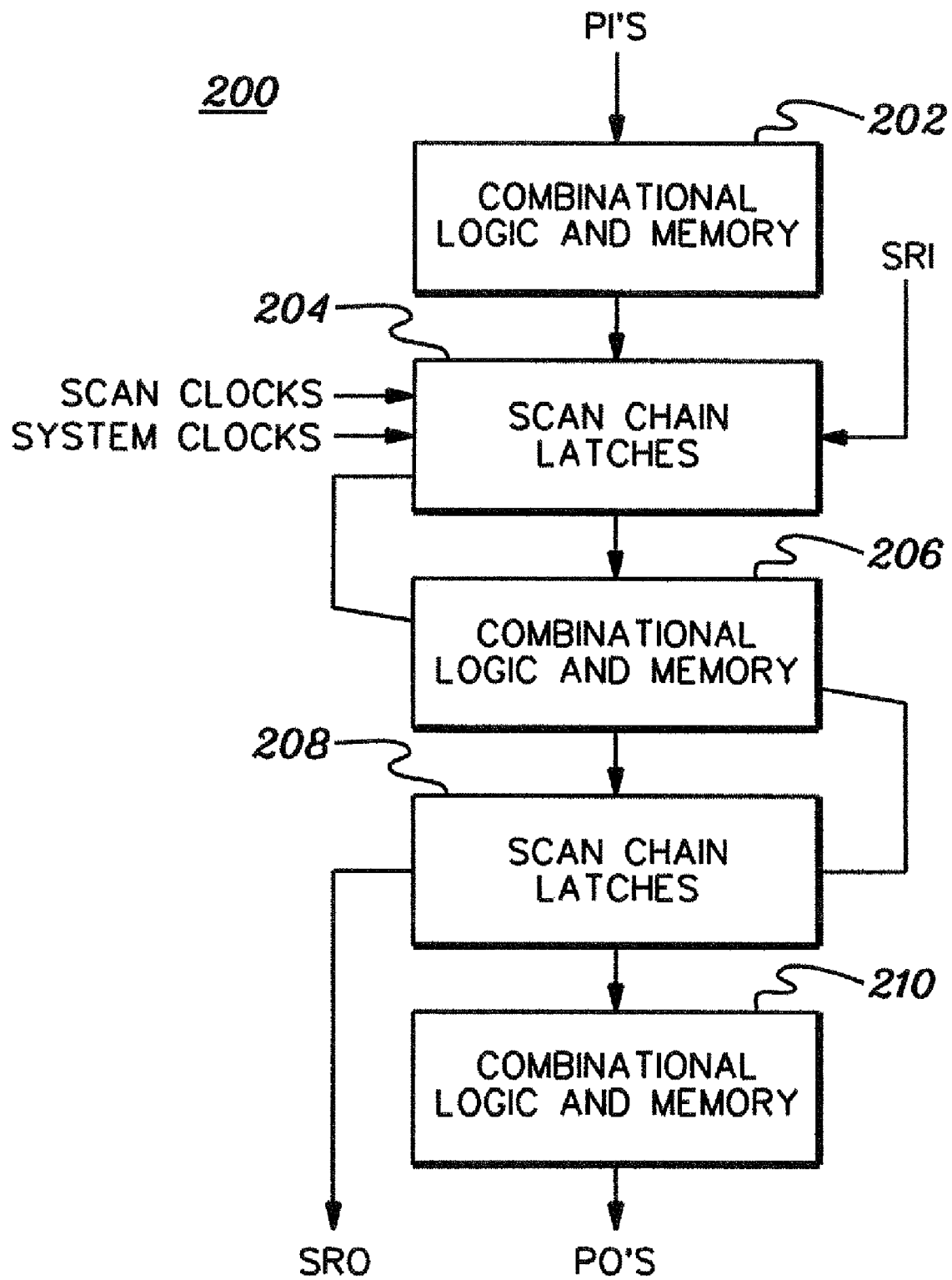
FIG. 2 is a block diagram of an exemplary scan chain arrangement to employ diagnostics testing, in accordance with an aspect of the present invention.
Figure 3:
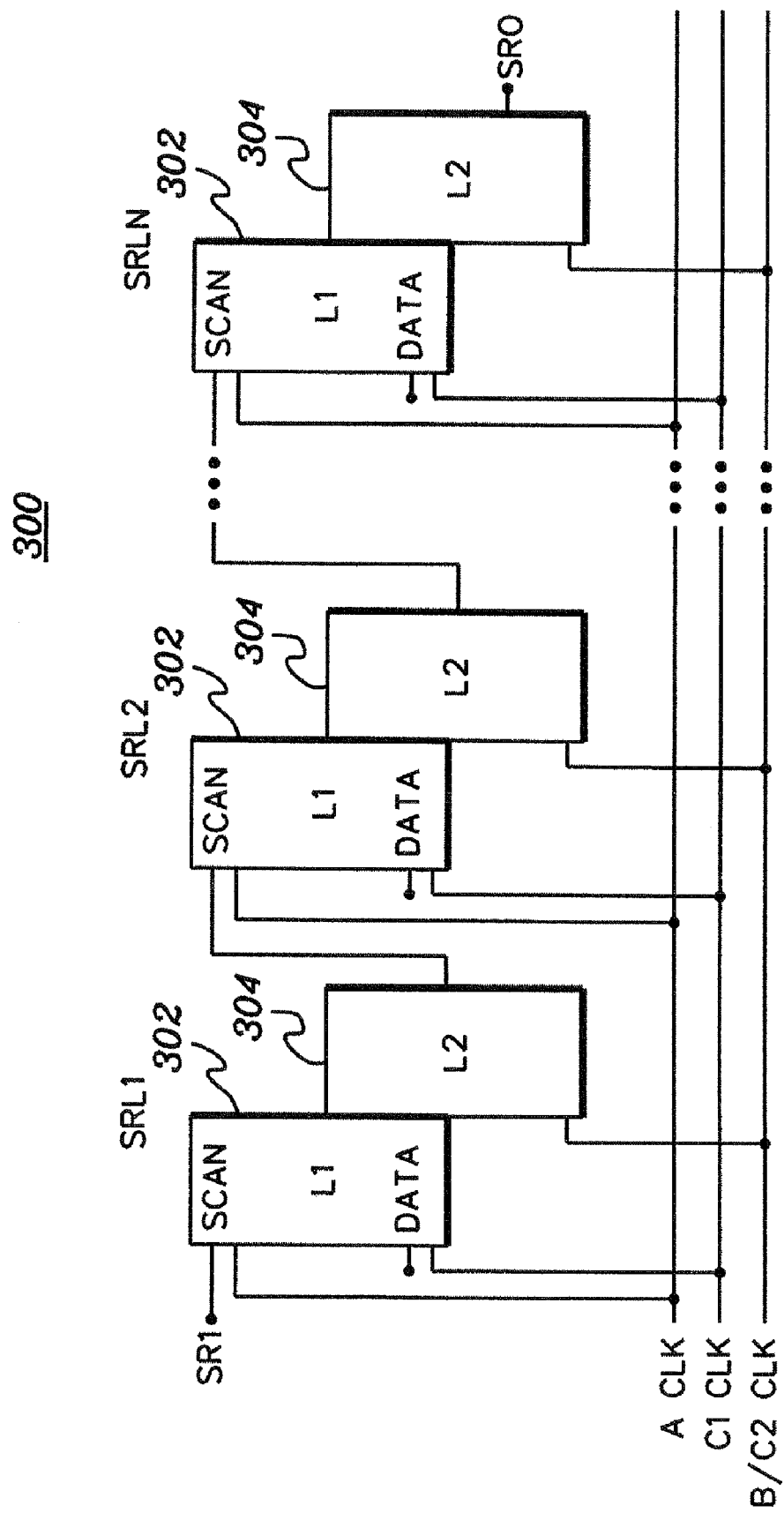
FIG. 3 is a more detailed block diagram of an exemplary scan chain arrangement to employ scan chain diagnostics, in accordance with an aspect of the present invention.

Referring now to FIGS. 2 and 3, there are shown exemplary scan chain arrangements generally designated by the reference characters 200, 300 for use in accordance with an aspect of the present invention.

FIG. 2 illustrates a typical LSSD configuration 200 including combinatorial logic and memory blocks 202, 206 and 210, primary inputs (PIs), as well as scan chain latches 204 and 208. These scan chain latches 204 and 208 propagate to and receive signals from the combinatorial logic and/or memory blocks, other scan chain latches, as well as PIs. During circuit operation, data is inputted to the combinatorial logic and memory blocks 202, 206 and 210, and the inputs to the scan chain latches 204 and 208. Data is outputted to primary outputs (POs) and shift register outputs (SROs). During testing, the scan chain latches 204 and 208 can also be loaded serially via the SRIs and unloaded via the SROs using the scan clocks.

FIG. 3 illustrates a typical LSSD scan chain 300 including a chain of Shift Register Latches (SRLs), SRL1-SRLN, each including a master latch L1 302 and slave latch L2, 304. The master latch L1, 302 has a pair of data ports SCAN data and system DATA, that may be captured by the latch responsive to a first scan clock A CLK or a first functional system clock C1 CLK. The slave latch L2, 304 captures the value stored in the master latch L1, 302 responsive to either a second scan clock B CLK or a second functional system clock C2 CLK. As shown in FIG. 3, the second scan clock B CLK and the second functional system clock C2 CLK are combined as a single clock signal B/C2 CLK. The second scan clock B CLK and the second functional system clock C2 CLK are typically driven out of phase with both the first scan clock A CLK and the first functional system clock C1 CLK applied to the master latch L1, 302. The LSSD scan A, B clocks and system C1, C2 clocks are assumed to be functional. A test pattern sequence may include a Load of the scan chains, primary inputs (PIs), a pulsing Clock and an Unload sequence of the scan chains.

While the invention is described herein with respect to LSSD scan design, it should be understood that the concepts presented are applicable to any other general scan design.

The techniques for diagnosing broken shift registers described above in the background of the invention portion of this application, generally rely on an assumption that the latches can be loaded via the system port. By propagating data through logic and arrays, the latches can be loaded with random data, which can be unloaded to determine the failing latch(es). Scan chains which contain control latches and fuse latches generally do not include latches which capture the output of the arrays and logic on a device. Therefore, many of the above-outlined techniques do not apply to diagnosing control latches and fuse latches of a scan chain. Power up/down and voltage/timing sensitivity techniques can be employed to diagnose this type of latch. However, voltage/timing sensitivity techniques can only be applied if a scan chain operates under certain conditions, and power up/down techniques are unreliable since they rely on the biased power-on states of the latches.

Thus, presented herein is a technique to employ on-chip fuses (such as on-chip electronic or laser fuses) to load, for example, zeros into a broken scan chain which is stuck-at 1. An electronic fuse (E-fuse) which is not blown has a logical value of 0. By executing an E-fuse read pattern, the zeros from the E-fuses are loaded into the scan chain at known locations, and when the scan chain is subsequently unloaded, the values can be analyzed to quickly pinpoint a failing latch or a failing region of the scan chain. Scan chain diagnostics in accordance with aspects of the present invention is further described below with reference to FIGS. 4-11.

FIG. 4 illustrates a simplified scan chain, generally denoted 400, which includes a plurality of latches (e.g., Latch 1, Latch 2 ... Latch 8) serially connected between a scan-in 420 and a scan-out 430. Scan chain 400 also includes multiple fuses 410, which in one example, may be electronic fuses or laser fuses. There are eight latches shown, with six of the eight latches having associated fuses. An assumption is made that there is a stuck-at 1 defect in the scan chain at the output of latch 7. The result of an attempt to scan all zeros into the scan chain is shown in FIG. 5, wherein only latches 7 & 8 have a logic value 0, with all other latches in the scan chain having a value 1. By loading the fuse logic 0 values into the corresponding latches using a fuse read pattern, the latches in the scan chain assume the values shown in FIG. 6. Scanning out of these values from the broken scan chain results in actual latch values (8:1)=b '11001001' as shown in FIG. 8, with the location of the fuses aligned over the respective scan out values. FIG. 7 is a table showing the state of the latches as each step of the diagnostic technique and each shift operation is performed. By overlaying the fuse locations with the value of the latches read out (FIG. 8), it can be concluded that in this example, the broken latch is at (or adjacent to) latch 7. In general, the broken latch is the latch after the last operational latch, but before (or including) the location of the next fuse of the scan chain. In this case, latch 6 is operational, but latch 7 is not. Since latch 7 is a fuse latch, it must be the failing latch. The confidence that latch 7 is the failing latch is thus very high.

Figure 11:
FIG. 11 is a representation of the unloaded data of FIG. 10 compared with actual fuse locations to facilitate defect localization within the scan chain, in accordance with an aspect of the present invention.

FIG. 9 depicts another scan chain 900 configuration of eight latches (Latch 1, Latch 2 ... Latch 8) serially connected between a scan-in 920 and a scan-out 930. Six of these eight latches have associated fuses 910. By scanning zeros into the chain, loading the latches from the fuses, and scanning out the values, the results of FIGS. 10 & 11 are obtained, i.e., actual latches (8:1) logic values=b '11111000' are obtained. Comparing this result to the fuse locations (FIGS. 9 & 11) it is noted that the last operating latch is Latch 3 and the next fuse location is at Latch 6. Therefore, the scan chain defect (e.g., failing latch) is in the region between latches 4-6. In this case, it is not possible to pinpoint the fail to a single latch location, however, the confidence that the failing latch is in the latch range of 4-6 is very high.

Those skilled in the art should note that the diagnostics technique described above can be further modified by omitting the loading of the logic value 0 initially into the scan chain, and simply employing the fuses to load the logic value 0 at the known locations of the scan chain, followed by unloading logic values of the scan chain, determining whether the scan chain is defective, and if so, localizing the defect in the scan chain from the unloaded logic values by comparison thereof with the locations of the fuse latches in the scan chain.

To the extent that the scan chain already includes one or more fuses, then no additional circuit area overhead is required to implement the concepts of the present invention. However, if fuses are added, then additional circuit area overhead is required. The greatest amount of overhead would be required for one fuse latch per LSSD latch per scan chain. In many cases, this could be cost prohibitive. Thus, an alternative scenario would be to insert one fuse latch per "n" number of LSSD latches per scan chain, where "n" is a relatively small number of fuse latches that are acceptable for successful, efficient and timely physical failure analysis (PFA) and defect localization. As one example, a fuse could be inserted every 100 latches per scan chain.

Furthermore, a single fuse latch can be propagated into "x" number of scan chains gated by some set of stability state pins which would reduce the overall number of fuse latches needed to be inserted. For example, assuming the above heuristics, for a design with 1 million LSSD latches broken up into fifty scan chains, each including 20,000 latches, only 200 fuse latches would need to be inserted to meet the proposed design rule of one fuse latch every 100 (or some optimally determined number of) latches distributed into each of the 50 scan chains. Therefore, in this case, the extra circuit area overhead would be only 200 fuse latches, and its associated selection logic propagating to each scan chain. Besides the extra power consumption for these 200 latches, the additional wiring between the fuse latch and the scan chains and the 0.02% latch circuit overhead, the benefits of this approach to diagnose broken scan chains, which is becoming the most predominate yield detractor (especially for 300 mm and larger wafer sizes) far outweighs any of the costs outlined above.

With the addition of the fuse fan-out technique noted above, large ranges in the latches to be diagnosed can be greatly reduced with minimal hardware/real estate overhead, thereby increasing the diagnosability of the product.

As a further enhancement for a stuck-at 0 case, when a scan chain is functional, then that chain can be loaded with logic value 1 (and not rely on the unblown fuses to be a 0). By way of example, the fuses can be used to insert logic 1 data at known locations by first blowing the fuses. The logic 1 data, in turn, can be propagated to other scan chains, and diagnostics for a stuck-at 0 case can proceed in a manner similar to the process described above for the stuck-at 1 condition.

A more complete case, which would not rely on the chain containing the fuses being functional, and require minimal hardware additions and non-critical paths, would be to have an invert (or an OR) function at the outputs of the fuses controlled from a stability state pin, which would be able to propagate a logic value 1 through the paths for unblown fuses.

A less comprehensive approach, would be to have the diagnostics technique described herein target latches and scan chains containing "control" latches (e.g., general purpose test registers), and rely on other lateral insertion methods (such as those noted in the background and described in the cross-referenced applications), to diagnose the "logic" latches.

An article of manufacture or a computer program product can be provided embodying the techniques of the present invention. A computer program product would include a recording medium, such as a floppy disk, a high-capacity read only memory in the form of an optically read compact disk or CD-ROM, a tape, etc., and a transmission type media, such as a digital or analog communications link, or a similar computer program product. This recording medium would store one or more programs for carrying out the methods for implementing broken scan chain diagnostics in, for example, the computer test system 100 of FIG. 1, and in accordance with the discussion above. A sequence of program instructions or a logical assembly of one or more inter-related modules defined in the recorded programs direct the computer system 100 in implementing broken scan chain diagnostics, in accordance with aspects of the present invention.

The diagrams depicted herein are just examples. There may be many variations to these diagrams or the steps (or operations) described therein without departing from the spirit of the invention. For instance, certain steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. Apparatus for performing diagnostics on a scan chain having a plurality of latches, the apparatus comprising:
    a computer test system comprising means for diagnosing a scan chain employing at least one fuse coupled to at least one latch of the scan chain to load a first logic value into the at least one latch at known location(s) within the scan chain, wherein the at least one fuse couples to the at least one latch at a system port thereof; and
    wherein the means for diagnosing the scan chain further comprises means for unloading values from the scan chain, and if the scan chain is broken, for localizing a break in the scan chain from the unloaded logic values by comparison thereof with the known location(s) of the at least one latch of the scan chain loaded with the first logic value via the at least one fuse, wherein at least one known location of the known location(s) of the at least one latch is positioned between the break in the scan chain and a scan-out of the scan chain.

2. The apparatus of claim 1, wherein the means for diagnosing the scan chain employing at least one fuse further comprises means for executing a fuse read pattern to initiate loading of the first value from the at least one fuse into the at least one latch of the scan chain.

3. The apparatus of claim 1, wherein the means for diagnosing the scan chain further comprises means for employing multiple fuses coupled to multiple latches of the scan chain to load the first logic value into the multiple latches at known locations of the scan chain to facilitate localizing the break in the scan chain when the scan chain is broken.

4. The apparatus of claim 3, wherein each fuse of the multiple fuses comprises an electronic fuse or laser fuse.

5. The apparatus of claim 3, further comprising means for predesigning the scan chain with at least some fuses of the multiple fuses spaced periodically within the scan chain every n latches of the scan chain, wherein n is greater than one.

6. The apparatus of claim 1, wherein the first logic value comprises a logic value 0, and wherein the at least one fuse is an open fuse, and the means for diagnosing the scan chain comprises means for executing a fuse read pattern to transfer the logic value 0 from the at least one fuse into the at least one latch at the known location(s) of the scan chain.

7. The apparatus of claim 1, wherein the first logic value comprises a logic value 1, and the apparatus further comprises means for programming the logic value of the at least one fuse to load a logic value 1 into the at least one latch at the known location, wherein the means for programming comprises means for at least one of blowing the at least one fuse, inverting an output of the at least one fuse, or applying a logic OR function to the output of the at least one fuse.

8. The apparatus of claim 1, wherein the means for localizing a break of the scan chain comprises means for determining a broken region of the scan chain containing a stuck-at 0 or a stuck-at 1 condition.

9. The apparatus of claim 1, wherein the means for diagnosing the scan chain further comprises means for loading the first logic value into the scan chain by attempting to propagate the first logic value from a scan-in input to the scan-out output of the scan chain, wherein the scan chain is broken when after the attempted propagation a logic value at the output is other than the first logic value propagated from the input.

10. At least one program storage device readable by a processor, tangibly embodying at least one program of instructions executable by the processor to perform when executing a method for performing diagnostics on a scan chain having a plurality of latches, the method comprising:
    diagnosing a scan chain employing at least one fuse coupled to at least one latch of the scan chain to load a first logic value into the at least one latch at known location(s) of the scan chain, wherein the at least one fuse couples to the at least one latch at a system port thereof; and
    wherein the diagnosing the scan chain comprises unloading logic values from the scan chain, and if the scan chain is broken, localizing a break in the scan chain from the unload logic values by comparison thereof with the known location(s) of the at least one latch of the scan chain loaded with the first logic value via the at least one fuse, wherein at least one known location of the known location(s) of the at least one latch is positioned between the break in the scan chain and a scan-out of the scan chain.

11. The at least one program storage device of claim 10, wherein the diagnosing the scan chain further comprises employing multiple fuses coupled to multiple latches of the scan chain to load the first logic value into the multiple latches at known locations of the scan chain to facilitate localizing the break in the scan chain when the scan chain is broken, wherein the scan chain is predesigned with at least some fuses of the multiple fuses spaced periodically within the scan chain every n latches of the scan chain, wherein n>2.

* * * * *